Nov. 2, 1948.  L. L. JONES  2,452,574
METHOD OF WELDING SEAM PORTIONS OF
ELECTRICALLY CONDUCTING ARTICLES
Filed Oct. 29, 1946
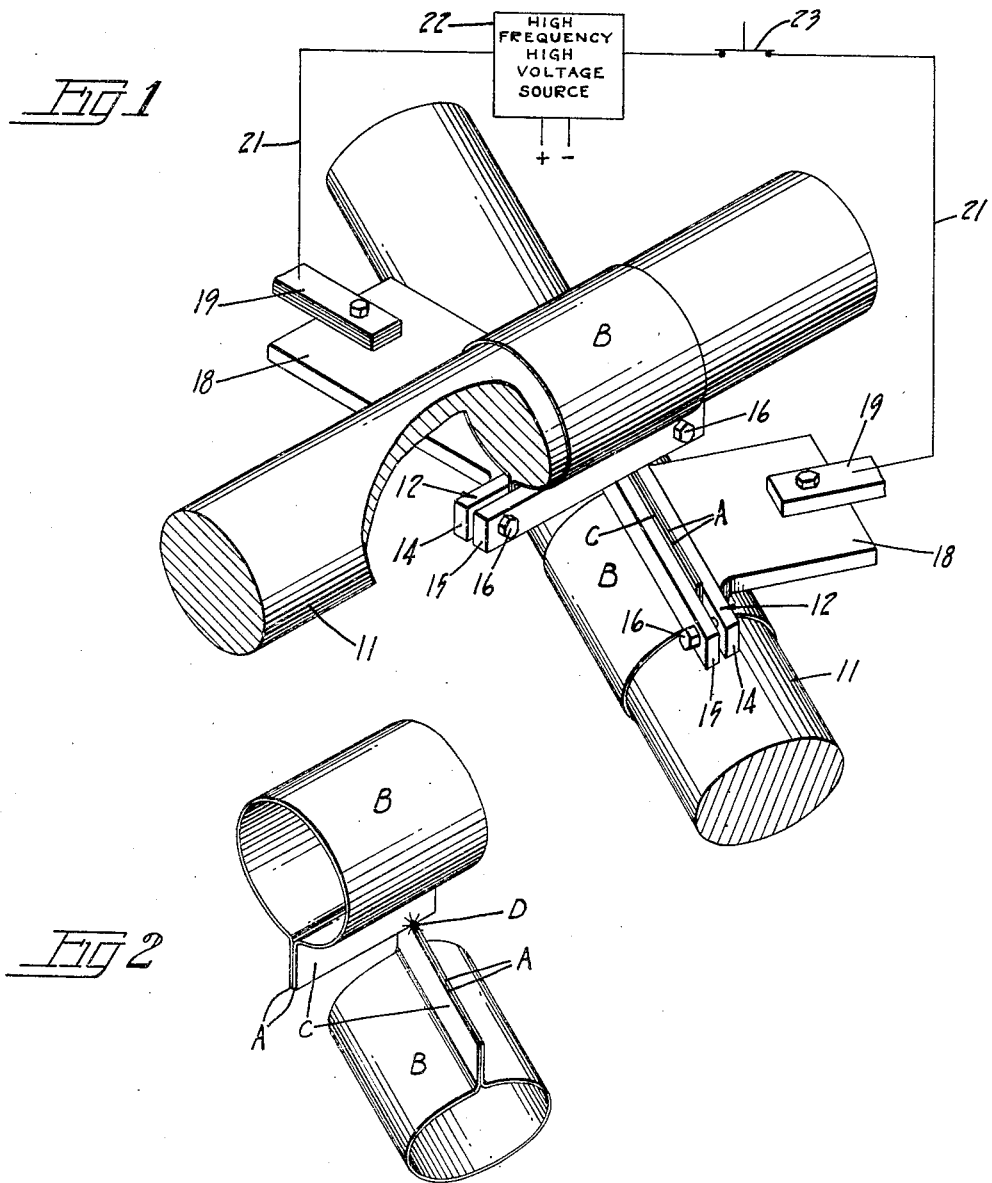
INVENTOR.
Lyman L. Jones
BY Ivan D. Thornburgh
Charles H. Erne
ATTORNEYS Patented Nov. 2, 1948

2,452,574

UNITED STATES PATENT OFFICE 2,452,574

METHOD OF WELDING SEAM PORTIONS OF ELECTRICALLY CONDUCTING ARTICLES

Lyman L. Jones, Seattle, Wash., assignor to American Can Company, New York, N. Y., a corporation of New Jersey Application October 29, 1946, Serial No. 706,481

8 Claims. (Cl. 219—10)

1

The present invention relates to a method of electric welding and has particular reference to welding the portions of two articles simultaneously while using the articles as electrodes.

An object of the invention is the provision of a method of electric welding wherein an electric welding current is passed from portions of one article to be welded to portions of another article to be welded so that the portions of both articles will be separately welded thereby producing simultaneously two separate and independent welded articles.

Another object is the provision of such a method of electric welding wherein the separate welding of portions of the two independent articles are effected by an electric arc established between the portions of the two articles, the articles being utilized as electrodes so that the welding arc heats the portions of both articles to a welding temperature to produce simultaneously two separate and independent welded articles.

Another object is the provision of such a method of electric welding wherein articles having long sections, such as means to be separately welded are moved relative to one another during the welding operation so that the seam portions of the articles are progressively welded while the electric arc remains relatively stationary.

Another object is the provision of such a method of electric welding wherein the welding of seams may be effected at exceedingly high rates of speed.

Numerous other objects and advantages of the invention will be apparent as it is better understood from the following description, which, taken in connection with the accompanying drawings, discloses a preferred embodiment thereof.

Referring to the drawings:

Figure 1 is a perspective view of principal parts of an apparatus for welding the side seams of can bodies in accordance with the steps of the instant method invention, with parts broken away; and Fig. 2 is a perspective view of a pair of can bodies in position for welding in the apparatus shown in Fig. 1.

As a preferred embodiment of the instant method invention the drawings illustrate the welding of side seam edges A of partially formed sheet metal tubular container or can bodies B. The can bodies are prepared for the seam welding operation by having marginal edge portions C (Fig. 2) bent outwardly at right angles to the body and pressed flat against each other for the full length of the bodies to arrange the side seam edges A in parallelism and in adjacent positions.

In accordance with the method steps of the invention the side seam edges A of a can body B are first brought together in parallel and adjacent relation and then are clamped against displacement. When the side seam edges of two such bodies B have thus been prepared, these seam edges are positioned adjacent and opposite each other, as for example, by placing the bodies horizontally one above the other, with their seam edges facing each other, as shown in Fig. 2.

While the seam edges A of the two can bodies B are disposed in this opposed position an electric arc D is established between the two sets of seam edges by the passage of an electric current therebetween, the ends of the arc terminating in the seam edges. This arc heats the clamped seam edges A of both bodies simultaneously to a welding temperature and thus reduces the seam edges of each body to a fluid or plastic condition. The fluid metal of the two clamped edges of each body flows together or merges into a single nodule or mass and upon cooling welds together the two edges to produce the welded can body. The same action takes place in the clamped seam edges of the second or cooperating can body. Hence the side seam edges of both can bodies are separately but simultaneously operated upon and thereby two separate and independent welded bodies are simultaneously produced.

Where the seam edges A of the bodies B are to be spot welded the bodies may be held in a fixed position. Where long seams are to be welded, as for example, a seam extending the full length of the can body, as shown in Fig. 2, the bodies preferably are moved relative to one another. This may be in a manner which relatively fixes the arc in space while the seam edges A are moved through the arc.

This relative movement of the bodies may be effected in various ways as by shifting the bodies in the same general direction but at an angle to each other so that the projected paths of travel of their seam edges A intersect at the arc D as shown. However, if desired the bodies may be swung through curved paths of travel provided their seam edges intersect at the arc D. The same results may be obtained where the bodies are moved parallel to each other and in opposite directions with the seam edges passing through the arc D.

Preferably, the seam edges A of the one body are brought into engagement with the seam edges of the second or cooperating body and are rubbed along each other as the bodies move along their respective paths of travel during the welding operation. Excellent results, however, have been obtained when the seams of the two bodies have been maintained in slightly spaced relation and in some cases this separated condition is preferred.

One form of apparatus for welding the can bodies B in accordance with the method steps of the invention is disclosed in Fig. 1. In such an apparatus the two can bodies B to be welded simultaneously are supported on mandrels or horns 11. These two mandrels are located one above the other in spaced relation and are disposed at an angle to each other so that the paths of travel of the bodies moving along the horns will intersect.

The bodies B surround the horns, with the seam edges A of the upper body extending downwardly and the seam edges of the lower body extending upwardly. The seam edges of the two bodies are thus in opposed relation to each other. The space between the horns is maintained so as to permit the passage of the bodies along the horns with the desired distance between the seam edges of the passing bodies. As suggested above this spacing of the horns may be such as to permit rubbing engagement of the seam edges of the passing bodies.

In the embodiment shown the two can bodies B are propelled along the horns 11 individually and in the same general direction each by proper movement of a head 12 disposed adjacent the corresponding horn. The movement of each head along its horn may be made in any suitable manner, the lower head moving along the top of the lower horn and the upper head moving along the bottom of the upper horn.

Each clamp head 12 is formed with an integral clamp bar 14 and a loose clamp bar 15. Bar 15 is held in place by clamping screws 16. The integral clamp bar is formed on a support arm 18 which carries one end of a flexible bus bar 19. The bus bars of the two heads are connected by conductors 21 to a source 22 of alternating current of suitable voltage. A normally open switch 23 may be connected in the line to control the flow of the electric welding current to the can bodies.

In operation, the marginal edge portions C of the two can bodies B on their respective horns 11 are separately inserted into place between the clamp bars 14, 15 of the heads 12 and the seam edges A are brought into parallel alignment. The edges are then clamped against displacement by manipulation of the clamp screws 16 against the loose clamp bars 15. In this clamped position the seam edges A of the two can bodies project slightly beyond the inner faces of the clamp bars.

With the seam edges A thus clamped against displacement, the clamp heads 12 move along their respective horns 11 in timed relation and thus propel the can bodies B along the horns in synchronism. The timing is such that the leading corners of the seam edges A of the two moving can bodies come into register at the point of intersection of the paths of travel of the can bodies. At this point of register, with the electric switch 23 closed, the electric welding current flows from its source 22 along one of the conductors 21 and one bus bar 19, into the adjacent head 12 and through the clamped edge portion C of that particular can body. The welding current passes or jumps from such a can body seam edges to the seam edges of the other can body, returning through its head 12, bus bar 19 and conductor 21 to the source of the current.

This passage of the electric welding current from the seam edges of one can body to the intersecting seam edges of the other can body establishes the welding arc D at the point of intersection of the seam edges. Since the ends of the arc terminate in the seam edges, no electrodes are necessary, the can bodies themselves acting as the electrodes. The heating effect of the arc is thereby concentrated in the seam edges A. The seam edges A of each can body thus are simultaneously and separately reduced to a fluid or plastic condition and flow together as hereinbefore mentioned to weld the clamped edges of both can bodies.

As the two can bodies continue to advance along their respective horns 11 and thus cross each other's path of travel, progressive portions of the seam edges A of the two bodies move through the arc D, the arc in effect remaining stationary in space. Hence the entire lengths of the seam edges A of the two can bodies are progressively welded as the bodies advance. When the terminal ends of the seam edges of the two can bodies come into register and pass into the arc the welding current is cut off by the opening of the switch 23. This extinguishes the arc D and thus terminates the welding operation.

Thus the side seams of both can bodies are effectively welded and two separate and independent welded can bodies thereby produced.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of welding seam portions of electrically conducting articles, which comprises positioning seam portions of two such articles in opposed relation, and passing an electric welding current from the seam portions of one of said articles directly to the seam portions of the other to weld the seam portions of both articles, thereby producing simultaneously two separate and independent welded articles.

2. A method of welding seam portions of electrically conducting articles, which comprises moving one such article relative to another with the seam portions of the two articles opposing each other, and passing an electric welding current from the seam portions of one of said articles directly to the seam portions of the other of said articles during their relative movement to simultaneously weld the seam portions of both articles, thereby producing simultaneously two separate and independent welded articles.

3. A method of welding seam portions of electrically conducting articles, which comprises positioning the seam portions of two articles adjacent each other, creating an electric arc between said articles with the ends of the arc terminating in the seam portions of the two articles, and effecting relative movement between said articles for passing the seam portions of the articles through said arc for simultaneously welding the seam portions of both articles thereby producing simultaneously two separate and independent welded articles.

4. A method of welding seam portions of electrically conducting articles, which comprises moving two such articles along separate paths of travel having a projected point of intersection with the seam portions of the articles presented towards each other in juxtaposed relation, and passing an electric welding current directly from one to the other of the juxtaposed seam portions of the two articles to heat the seam portions to a welding temperature simultaneously as they pass through the projected point of intersection of their paths of travel for simultaneously independently welding the seam portions of both articles, thereby producing simultaneously two separate and independent welded articles.

5. A method of welding electrically conducting articles, which comprises clamping together the meeting seam portions of each of the articles to be welded, positioning the clamped seam portions of two such articles in juxtaposed relation, and passing an electric welding current from the seam portions of one of said articles directly to the seam portions of the other to simultaneously weld the seam portions of both articles, thereby coincidentally producing two separate and independent welded articles.

6. A method of electrically welding complementary edges of thin sheet metal to produce a side seam for a container body, which comprises separately clamping together the seam edges of two bodies to be welded, positioning the clamped seam edges of the bodies closely opposing each other, and passing an electric welding current from the seam edges of one of said bodies directly to the seam edges of the other to simultaneously weld the seam edges of both bodies, thereby coincidentally producing two separate and independent container bodies having separate welded side seams.

7. A method of welding seam portions of electrically conducting can bodies, which comprises moving one such body relative to and at an angle to another such body with the seam edges of the two bodies in opposed contiguous relation, and passing an electric welding current directly from the seam portions of one of said articles to the seam portions of the other of said articles during their relative movement to simultaneously weld the seam portions of both articles, thereby coincidentally producing two separate and independent welded articles.

8. A method of electrically welding complimentary portions of thin sheet metal articles, which comprises separately clamping together portions of complimentary parts of two different articles, positioning the clamped portions in closely opposed relation, and passing an electric welding current from the clamped portions of one article directly to the adjacent clamped portions of the other article to simultaneously weld the adjacent portions to produce two separate welded articles.

LYMAN L. JONES.

REFERENCES CITED

The following references are of record in the file of this patent:

FOREIGN PATENTS

| Number | Country | Date |
|---|---|---|
| 380,397 | Great Britain | Sept. 15, 1932 |